July 29, 1958

C. W. HUBER 2,844,940

MASTER CYLINDER

Filed June 22, 1953

Clarence W. Huber
INVENTOR.

BY *Clarence A. O'Brien*
*and Harvey B. Jackson*
Attorneys

July 29, 1958

C. W. HUBER 2,844,940

MASTER CYLINDER

Filed June 22, 1953

Clarence W. Huber
INVENTOR.

BY *Clarence A. O'Brien*
*and Harvey B. Jacobson*
Attorneys

July 29, 1958  C. W. HUBER  2,844,940
MASTER CYLINDER
Filed June 22, 1953  3 Sheets-Sheet 3

Clarence W. Huber
INVENTOR.

BY *Clarence A. O'Brien
and Harvey B. Jacobson*
Attorneys

United States Patent Office 2,844,940
Patented July 29, 1958

2,844,940

MASTER CYLINDER

Clarence W. Huber, Milan, Ohio

Application June 22, 1953, Serial No. 363,319

3 Claims. (Cl. 60—54.6)

This invention relates generally to hydraulic brake systems and pertains more particularly to an improved form of master cylinder which will require a minimum of pedal pressure in association therewith to effect actuation of the brake.

Another object of this invention is to provide an improved form of master cylinder wherein dual piston assemblies are associated therewith, these pistons being effective to initially take up all lost motion in the braking system to initially engage the brake shoes with their associated drums and to apply the braking action of the shoes with their drums, these functions being performed by respective cylinders in sequential fashion.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a view similar to Figure 2 but on reduced scale showing the position of the parts during the initial take-up action;

Figure 7 is a plan view of the top of the master cylinder.

Figure 1:
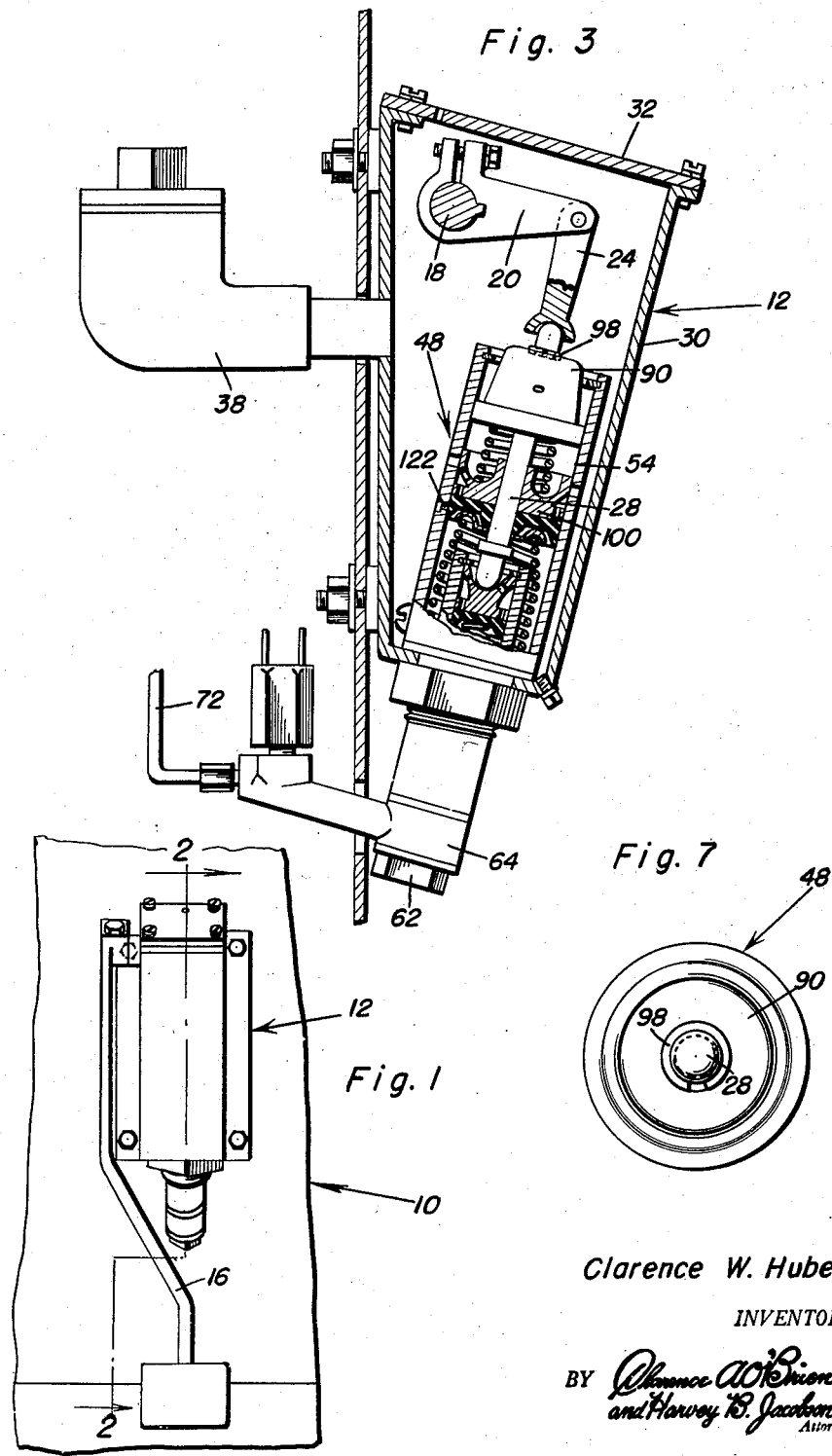
Figure 1 is a vertical elevation showing a portion of a vehicle indicating the manner of utilizing this invention.
Figure 2:
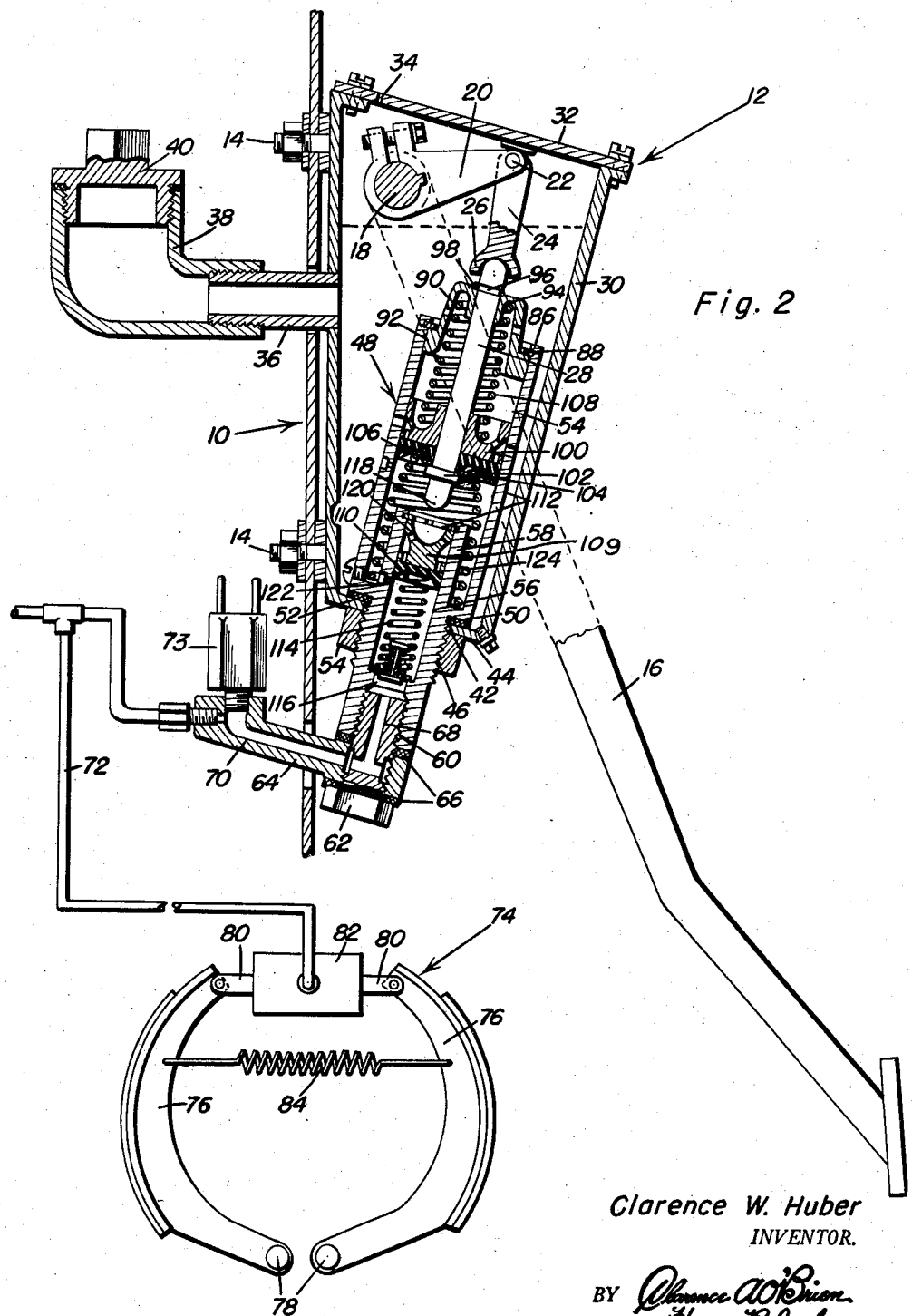
Figure 2 is an enlarged vertical section taken substantially along the plane of section line 2—2 of Figure 1 showing details of construction of the master cylinder.
Figure 4:
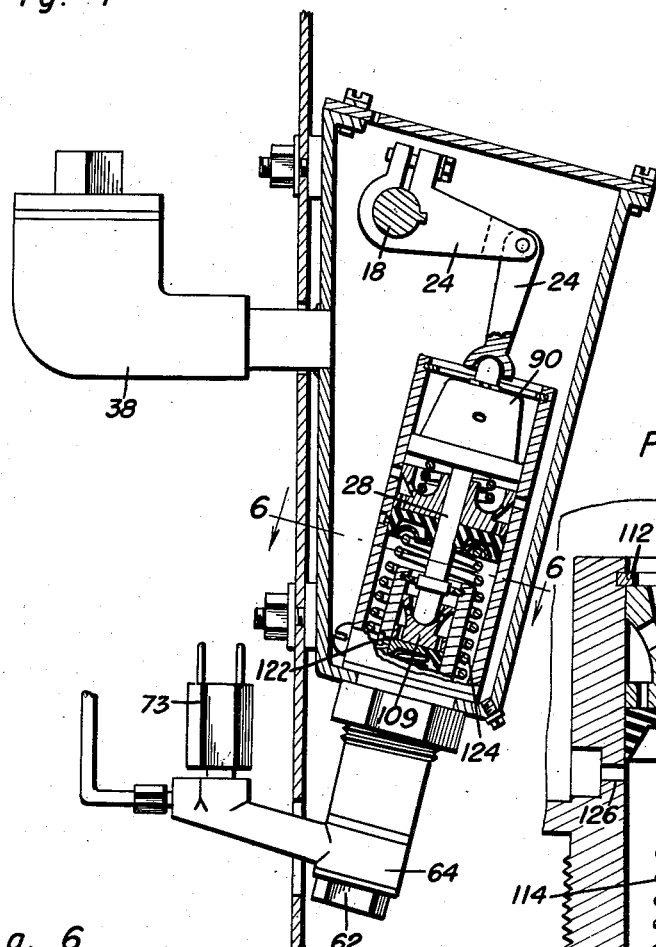
Figure 4 is a view similar to Figure 3 but showing the position of the part in the brake applying position.

Referring now more particularly to Figures 1 and 2, reference numeral 10 indicates generally the fire wall of a vehicle to which the master cylinder assembly indicated generally by the reference character 12 is suitably attached, as by the fasteners 14. Although the brake pedal 16 is shown of the suspended type wherein its cross rod 18 is pivoted for movement at the upper end of the pedal shaft, it will be apparent that the particular construction of the pedal assembly is unimportant insofar as the principles of operation of this invention are concerned. The right pedal assembly includes the actuating lever 20 provided at its outer free end with a pivoted pin connection 22 to the push rod link member 24 whose lower end is belled as indicated by the reference character 26 to engage upon the upper end of the actuating plunger 28.

As seen most clearly in Figure 2, the master cylinder assembly includes the reservoir casing 30 which may be provided with a top cover member 32 either integrally formed therewith or suitably secured thereto and which may be provided with a relief aperture 34 in the manner shown. The inlet nipple 36 projects through a suitable opening in the fire wall 10 and is provided at its free end with the filler neck member 38 having the filler plug 40 threadedly engaged therewith which can be removed to replenish the supply of hydraulic fluid within the casing.

The lower end of the casing is provided with an opening 42 in its bottom wall 44 and the threaded shank 46 of the cylinder assembly indicated generally by the reference character 48 projects therethrough, this threaded shank being of reduced diameter with respect to the cylinder to provide the shoulder 50 which provides a seat against which the resilient washer member 52 is engaged when the lock nut 54 is screwed tightly against the outer side of the bottom wall 44 to not only effectively seal the opening 42 but also rigidly support the cylinder assembly within the casing. The cylinder is provided with an enlarged bore 54 extending throughout the central and upper portion thereof and the lower end of the cylinder is provided with the reduced bore 56 and the neck 58 forming a continuation of this bore projects upwardly within the enlarged bore portion of the cylinder. The extreme lower end of the cylinder is internally threaded as indicated by the reference character 60 for receiving the threaded end of the fastening bolt 62 which is also threadedly engaged with the threaded bore of the adapter member 64, the gasket members 66 being provided for proper fluid seal. Element 62 is provided with a T-shaped bore 68 communicating the interior of the cylinder assembly with the bore 70 of the adapter member. This bore connecting the fluid line 72 in the manner shown and also being provided with an outlet aperture for connecting with the stop light switch assembly 73.

The brake assembly 74 is shown diagrammatically in Figure 2 and includes the brake shoes 76 secured to their backing plate by means of the anchor pins 78 and having their upper free floating ends connected to the piston rod 80 extending from the slave cylinder 82. Brake spring 84 normally urges the shoes together out of engagement with their associated brake drum, not shown. The brake construction is entirely conventional in nature and it is to be understood that any desired type of brake may be used.

The upper end of the cylinder 48 is grooved as indicated by the reference numeral 86 and receives therein the snap ring 88 which forms a stop member for the cup 90 whose enlarged collar portion 92 is engaged with the inner service of the enlarged bore 54 in the manner shown. The central portion of this cup is provided with the boss 94 through which the actuating plunger 28 extends and the plunger is grooved as indicated by the reference character 96 to receive the snap ring 98 engagable with the cup 90 to transmit downward motion of actuating plunger thereto. Piston 100 is slidable within the enlarged bore 54 and the resilient piston cup 102 is associated therewith in the manner shown, the lower end of the plunger being provided with the enlarged shoulder 104 against which the seat washer 106 is engaged. The coil spring 108 is disposed concentrically of the actuating plunger and seats at its opposite ends against the cup and the piston respectively so that the cup 102 presses the washer 106 against the shoulder 104 with the cup being engaged with the snap ring 98 in the manner illustrated.

The smaller bore 56 of the cylinder assembly reciprocably receives the piston member 109 having the resilient cup 110 associated therewith, the piston being normally urged toward the upper end of the neck portion 58 into engagement with the snap ring 112 under action of the coil spring 114 which engages at its lower end against the valve member 116. It will be noted that the lower end 118 of the actuating plunger is normally spaced away from the seat portion 120 of the piston 109 when the brake pedal assembly is disposed in its normal or inoperative position, this position being particularly shown in Figure 2.

Referring now more particularly to Figure 3, it will be noted that the brake pedal assembly has been slightly depressed to move the actuating lever 20 thereof in a downward manner to thus force the actuating plunger 28 downwardly within the cylinder assembly 48. This forces the piston 100 downwardly within the enlarged bore portion 54 past the relief aperture 122 whereby fluid within the cylinder will be forced outwardly therefrom into the brake line 72 to urge the brake shoes 76 away from each other into initial engagement with their associated brake drum, thus taking up all slack or lost motion in the braking system. In Figure 3, this operation has been almost completed. When all of the slack has been taken up in the braking system, the lower end 118 of the actuating plunger will engage with the piston 109 and further downward movement of the brake pedal and consequently the actuating plunger 28 will effect downward movement of the piston 109 which performs the actual braking operation of the brake shoes against their associated drums.

Figure 5:
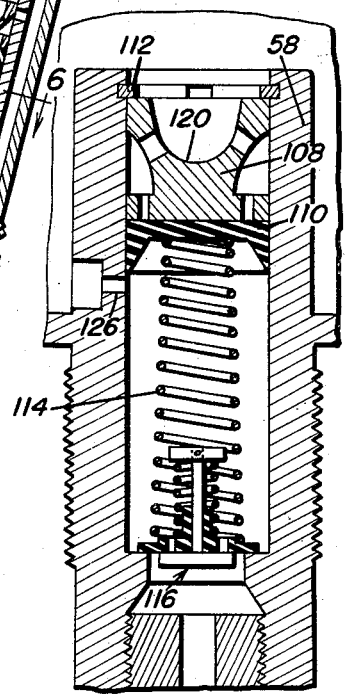
Figure 5 is an enlarged sectional view of the brake applying piston in cylinder assembly.
Figure 6:
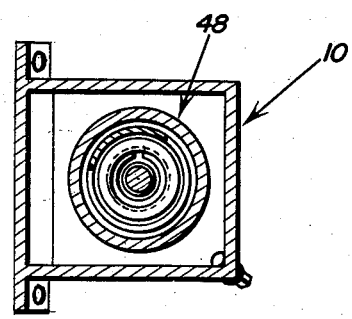
Figure 6 is a horizontal section taken substantially along the plane of section line 6—6 of Figure 4.

The construction of the coil spring 108 is such that the piston 100 will be carried with the actuating plunger only that distance required to overcome the action of the various brake springs 84 to urge the brake shoes into slight engagement with their drum. Thereafter, further downward movement of the pedal assembly will effect substantially no movement to the piston 100, it being thus seen that this piston effects substantially no effort in the actual braking of the vehicle upon which the assembly is to be used. It will be noted that this effect is further enhanced by the provision of the reaction spring 124 which is disposed concentrically of the neck 58 and engages against the washer 106 to help maintain a stabilized position of the piston 100 once the initial brake shoe take-up action has taken place. It will be appreciated that the relief passage 122 disposed at the lower end of the neck 58 permits fluid to be moved into the brake lines by the piston 100 only at such times as the piston cup 110 is disposed thereabove as indicated in Figure 5. After the piston cup 110 has moved below the relief passage 122, the larger piston 100 is effectively cut off from the brake lines 72.

It is to be noted that the larger of the pistons 100 will be made of such dimension that a relatively slight movement of the same will effect all the initial brake take-up action required on the vehicle with which it is associated. The piston 109, being substantially smaller than piston 100, will require considerably less brake pedal pressure to effect the same braking action between the shoes 76 and their associated drum than would be required with a single larger piston such as is commonly used on present day motor vehicles. In this way, the brake pedal has an extremely "soft" action which is becoming more and more in demand by modern automotive vehicle operators while at the same time it will be noted that relatively little pedal movement is required to effect the initial engagement of the brakes, thus allowing the brake pedal movement to be substantially reduced and generally allowing a safer and more desirable pedal action than is possible with conventional master cylinder assemblies.

The assembly is extremely simple and rugged in design and it will be manifest that it lends itself readily to ease of maintenance, the same requiring a minimum of skill in servicing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A hydraulic master cylinder assembly comprising a reservoir casing, an elongated cylinder disposed in said casing and having an enlarged bore at one end and a reduced bore at its other end, said casing having an opening through which said cylinder passes, a shoulder in said cylinder and seated on said casing around said opening, an actuating plunger reciprocable within both bores of said cylinder, a first piston carried by said plunger reciprocable within said enlarged bore, a second piston reciprocable within said reduced bore in the path of movement of said plunger and engageable therewith upon predetermined movement of the same, a seat member carried by said plunger, said first piston being slidably carried on said plunger in spaced relation to said seat member, a first spring disposed between and seated on said seat member and one side of said first piston, said seat member having a portion engaged with the inner surface of said cylinder for guiding the plunger therein, and a second spring seated on the opposite side of said first piston and said cylinder and reacting on said first piston in opposition to said first spring.

2. The hydraulic master cylinder assembly of claim 1 wherein said casing has walls, one of said walls having said opening through which said cylinder passes, means to mount said casing in an upright position in which position the bottom wall of said casing is angularly inclined with respect to a horizontal plane, and a drain at the lowermost part of said horizontal wall through which the liquid from said reservoir casing may be removed.

3. The hydraulic master cylinder assembly of claim 1 wherein said casing has a plurality of walls, one of said walls having an aperture, an operating linkage for said plunger and operatively connected with said plunger, said operating linkage being passed through said aperture and located within said casing.

References Cited in the file of this patent

UNITED STATES PATENTS

| | | |
|---|---|---|
| 2,036,342 | Loweke | Apr. 7, 1936 |
| 2,106,304 | McGee | Jan. 25, 1938 |
| 2,144,012 | Dodge et al. | Jan. 17, 1939 |
| 2,197,681 | Bowen | Apr. 16, 1940 |
| 2,232,350 | Swift | Feb. 18, 1941 |
| 2,276,853 | Majneri | Mar. 17, 1942 |
| 2,508,403 | Knauss | May 23, 1950 |
| 2,590,430 | Risse | Mar. 25, 1952 |
| 2,666,294 | Porter | Jan. 19, 1954 |

FOREIGN PATENTS

| | | |
|---|---|---|
| 411,537 | Great Britain | June 11, 1934 |
| 536,866 | France | Feb. 21, 1922 |